United States Patent [19]

McDaniel

[11] Patent Number: 4,540,757

[45] Date of Patent: Sep. 10, 1985

[54] POLYMERIZATION AND CATALYST

[75] Inventor: Max P. McDaniel, Bartlesville, Okla.

[73] Assignee: Phillips Petroleum Company, Bartlesville, Okla.

[21] Appl. No.: 656,392

[22] Filed: Oct. 1, 1984

[51] Int. Cl.$^3$ ............................ C08F 4/02; C08F 10/02
[52] U.S. Cl. .................................... 526/128; 502/105; 502/111; 502/115; 502/116; 502/120; 526/125; 526/129; 526/352; 526/906
[58] Field of Search ............... 502/105, 120; 526/128, 526/129

[56] References Cited

U.S. PATENT DOCUMENTS

| | | | |
|---|---|---|---|
| 3,324,095 | 6/1967 | Carrick et al. | 526/130 |
| 3,484,428 | 12/1969 | Kallenbach | 260/94.9 |
| 3,678,025 | 7/1972 | Birrell | 526/114 |
| 3,709,853 | 1/1973 | Karapinka | 526/130 |
| 3,787,384 | 1/1974 | Stevens et al. | 260/94.9 DA |
| 3,798,202 | 3/1974 | Nasser | 260/88.2 |
| 4,121,030 | 10/1978 | Candlin | 526/119 |
| 4,263,422 | 4/1981 | Lowery et al. | 526/97 |
| 4,391,736 | 7/1983 | Capshew | 526/119 |
| 4,435,518 | 3/1984 | Pennington et al. | 526/129 |
| 4,446,288 | 5/1984 | Hoff | 526/129 |
| 4,455,386 | 6/1984 | Lynch et al. | 526/129 |
| 4,478,988 | 10/1984 | Pullukot et al. | 526/129 |

*Primary Examiner*—Edward J. Smith
*Attorney, Agent, or Firm*—Howard D. Doescher

[57] ABSTRACT

Polymerization of olefins in the presence of a catalyst system comprising titanium-containing component (A) associated with a milled blend of at least two different silica-containing materials having different MI (polymer melt index) potentials in which at least one of the silicas has been treated with a chemical agent which reacts with OH groups on the surface of the silica and a dihydrocarbylmagnesium compound, and a cocatalyst component (B) comprising an organoaluminum compound. Ethylene polymers having broad molecular weight distribution are obtained using the catalysts defined herein.

15 Claims, No Drawings

POLYMERIZATION AND CATALYST

BACKGROUND OF THE INVENTION

This invention relates to the polymerization of olefins. In another aspect, this invention relates to a novel catalyst system useful for the polymerization of 1-olefins, especially for the production of ethylene polymers. In accordance with another aspect, this invention relates to a method of preparing a titanium-containing composition associated with a chemically treated particulate silica-containing composition and a dihydrocarbylmagnesium useful as a catalyst component for the polymerization of 1-olefins. In a further aspect, this invention relates to a process for the polymerization of olefins in the presence of a catalyst comprising a catalyst component (A) which is obtained as the at least partially milled product of a mixture of at least two different silica-containing materials in which at least one silica has been chemically treated, a dihydrocarbylmagnesium compound and a halogenated tetravalent titanium compound, and a cocatalyst component (B) comprising an organoaluminum compound. In another aspect, this invention relates to the use of a milled blend of silica-containing materials having widely different MI (polymer melt index) responses in which at least one of the silica-containing materials has been chemically treated so that an ethylene polymer of broad molecular weight distribution is obtained when a silica blend is used with a dihydrocarbylmagnesium compound, a halogenated tetravalent titanium compound and an organoaluminum cocatalyst (Component B).

It is known to polymerize 1-olefins and mixtures thereof in the presence of organometallic catalyst systems in a low pressure process. The activity of an olefin polymerization catalyst is one important factor in a continuous search for a catalyst useful for the polymerization of 1-olefins. It is also desirable that the process used in forming the catalyst be such as to allow ease in preparation and to allow control over the final catalyst formed. In addition, it is desirable in some instances to provide a catalyst for effecting the polymerization of olefins to polymers of broad molecular weight distribution.

The present invention is based upon the discovery that a catalyst having quite different properties is obtained if a milled mixture of different silica-containing supports having different physical properties, a dihydrocarbylmagnesium compound, and a titanium tetravalent halogenated compound is used as a catalyst component in the production of ethylene polymers. The ethylene polymers formed according to the invention exhibit broad melt index and broad molecular weight distributions.

Accordingly an object of this invention is to provide an improved process for the polymerization of 1-olefins.

Another object of this invention is to provide a novel and improved catalyst.

Another object of this invention is to provide a two-component catalyst system effected for the polymeization of 1-olefins.

A further object of this invention is to provide a process for the production of ethylene polymers having broad molecular weight distribution.

Other objects, aspects and the several advantages of this invention will become apparent to one skilled in the art upon reading this specification and the appended claims.

SUMMARY OF THE INVENTION

In accordance with the invention, a magnesium-and titanium-containing catalyst component (A) is prepared by milling a blend of at least two different silica-containing materials or supports having greatly different MI (polymer melt index) potentials in which at least one of the silicas has been chemically treated so as to modify the surface of the silica(s), either in the presence of or absence of an organomagnesium compound, and halogenated tetravalent titanium compound.

Further in accordance with the invention, a polymerization catalyst is provided comprising a titanium-containing component (A) as defined above and a cocatalyst component (B) comprising an organoaluminum compound.

In accordance with one specific embodiment of the invention, a milled particulate silica-containing support of the invention comprises a blend of at least two silica-containing supports in which at least one silica has been chemically treated or modified and at least one other silica has been chemically treated or has been activated at high activation temperature and/or has high pore volume and low surface area or has been activated at low temperature and/or has low pore volume and high surface area.

In one embodiment, the catalyst is formed in a multi-step process comprising
 (a) intensively milling at least two different silica-containing materials having different MI (polymer melt index) potentials in which at least one silica has been chemically treated,
 (b) contacting the product of (a) with a dihydrocarbylmagnesium compound, and
 (c) treating or reacting the product of (b) with a halogenated tetravalent titanium compound. Solid final product is separated from the reaction mixture, washed with a dry hydrocarbon to remove unreacted titanium compound and dried to obtain catalyst component (A) as a solid particulate material.

In another embodiment, the catalyst is formed in a multi-step process comprising
 (a) contacting a first silica-containing material with a dihydrocarbylmagnesium compound and a titanium tetravalent halogenated compound,
 (b) contacting a second silica-containing material having different properties from the first silica with an organomagnesium compound and a halogenated tetravalent titanium compound with the proviso that at least one of the silica-containing materials has been chemically treated, and
 (c) intensively milling the first and second silicas until an intimate milled blend is obtained. The solid final product can be separated, washed and dried to form catalyst component (A) as in the previous embodiment.

Thus, according to the invention, intimate blends of ethylene polymers having different MI, HLMI, $M_w/M_n$, etc are prepared by milling the different silica-containing catalyst components and using in a single polymerization process, rather than by conventional mechanical blending of ethylene polymers prepared in separate runs with different catalysts. An advantage of the invention process over conventional blending is reduced energy requirement and a more intimate polymer blend that behaves as a homogeneous polymer with a broad molecular weight distribution.

DETAILED DESCRIPTION OF THE INVENTION

As used herein in the specification and claims, the term "silica-containing materials which have different MI (polymer melt index) potentials" refers to two (or more) silicas which exhibit different MI (melt index) potentials if, after having been impregnated with the same hydrocarbylmagnesium and tetravalent titanium compounds at essentially the same levels, having been admixed with the same organoaluminum cocatalyst at essentially the same level, and then having been contacted with a reaction mixture comprising a 1-olefin at essentially the same polymerization conditions (temperature, 1-olefin pressure, pressure of $H_2$ if present, reaction time etc.), said silicas produce polyolefins having different melt indexes (melt flows; as determined in accordance with ASTM D1238).

In carrying out the invention, the silica-containing base can comprise any number of different silica-containing materials. It should be understood that the expression "at least two different silicas" refers to two or more silica-containing materials which have been prepared in a different manner or have different properties and characteristics or for other reasons are different or dissimilar and exhibit the characteristics defined. The base can include silica materials prepared in the same manner or which have similar properties so long as at least two of the silica-containing materials exhibit different MI potentials as defined and set forth hereinbefore.

The silica base used in preparing catalyst component (A) can be any silica prepared conventionally, e.g, employing vapor-phase hydrolysis or wet precipitation techniques. The silicas employed according to the invention should be at least two different silicas which have greatly different MI (polymer melt index) potentials. Factors that control MI response of silica include chemical treatment, precalcination temperatures of the silica and/or pore volume of silica.

The silica-containing base used in the preparation of component (A) comprises silica, silica-alumina, silica-boria, silica-thoria, silica-titania, silica-zirconia, or mixtures in which the silica contests is a major portion of at least 50 weight percent and preferably ranges from about 80 to 100 weight percent.

Chemical treatment of the silica supports relates to contacting the dry material with an agent selected from a chlorinating compound, an alkanol, a silating compound, an acid chloride, and an organoboron compound. The purpose of preparing catalysts with the treated supports is to allow at least some control of the melt index and molecular weight distribution of polymers made in their presence relative to polymers prepared from similar catalysts produced with untreated silica. In addition, the polymers exhibit a desirable particle size distribution typical of those polymers made in the presence of silica-supported catalysts.

Each chemical employed to contact the particulate silica reacts with part or substantially all of the OH groups on the surface of the silica depending upon the nature of the chemical and on the reaction conditions. The amount of chemical actually reacting can range from about 0.1 to about 1.8 mmoles chemical per gram (16.6 mmoles) silica and more preferably from about 0.8 to about 1.7 mmoles per gram silica. In terms of mole ratios silica to chemical, the corresponding values range from about 9:1 to about 166:1 broadly and from about 20:1 to about 166:1 more preferably. Since complete reactivity is not found in practice, the actual quantity of each chemical employed can be in excess of that theoretically required. Thus, the mole ratio of silica to chemical generally ranges from about 0.1:1 to about 166:1.

The conditions for contacting the silica supports with the chemical agents can vary appreciably depending upon the amounts and type of agent to be incorporated onto the support. The conditions of treatment will be sufficient to provide an activating amount of agent onto the support. Generally, the temperature of treatment will range from about 25° C. to about 900° C., preferably from about 100° C. to about 600° C. and the length of time of treatment can range from a few minutes to several hours.

The chlorinating compound is selected from the group consisting $CCl_4$, $COCl_2$, $SOCl_2$, $SO_2Cl_2$ and $S_2Cl_2$. $CCl_4$ is presently preferred because it leaves no residue.

The alkanol is a linear 1-alkanol containing from 1 to about 5 carbon atoms. Methanol is presently preferred because it is highly reactive but very stable thermally once attached to the silica.

The silating compound is a chlorosilane which can be expressed as $R_c^2SiCl_{4-c}$ in which $R^2$ is phenyl or alkyl group of 1 to about 6 carbon atoms, and c is an integer of 1, 2 or 3. Exemplary compounds include trichloromethylsilane, dichloropropylsilane, chlorotrimethylsilane, chlorotriphenylsilane, trichloro-n-pentylsilane, and the like, and mixtures thereof.

The carboxylic acid chloride can be expressed as:

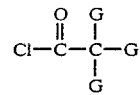

in which each G is selected from chlorine, alkyl of 1 to about 3 carbon atoms, hydrogen, and phenyl, with at least one G being chlorine. Thus concerning the other two G's, one can be alkyl or phenyl or one of each, or one can be hydrogen and the other can be alkyl or phenyl. Exemplary compounds include chloroacetyl chloride, dichloroacetyl chloride, phenylchloroacetyl chloride, 2,2-dichloropropionyl chloride, 2-chloropropionyl chloride, 2-chloro-2-methylpropionyl chloride, and the like, and mixtures thereof.

The organoboron compound is preferably a trihydrocarbylboron which can be expressed as $B(R^3)_3$ in which each $R^3$ can be selected from among hydrogen, alkyl, aryl and cycloalkyl, at least one $R^3$ in each compound being a hydrocarbon radical containing from 1 to about 6 carbon atoms. Exemplary compounds include trimethylborane, triethylborane, tri-n-hexylborane, tricyclopentylborane, triphenylborane, methyldiethylborane, n-propyl-n-hexyl-borane, and the like, and mixtures thereof. The trialkylboranes are preferably utilized because of their availability and ease of handling.

It is within the scope of the invention to use at least two silicas that have been chemically modified or treated so as to provide silicas having different physical properties with respect to MI response and potential. It is also within the scope of the invention to use one or more chemically treated different silicas with at least one other silica having a different MI potential which has been calcined and/or prepared to have pore volumes such that the final blend of silica support is active for producing an ethylene polymer having broad molecular weight distribution. The silica base can be calcined in air at an elevated temperature ranging from about 100° to about 900° C. Silicas having a pore volume ranging from about 0.3 to about 3.0 cc/gm can be used.

The composition of the silica mixture of the first and second silicas can be of any proportions of the two silicas and is not limited in any respect in relation thereto, except as regards the property of the polymer product desired. This is to say that while equal weight ratios of the first and second silicas are conveniently employed, any weight ratios can be used.

The dihydrocarbylmagnesium compound can be expressed as $MgR_2$ in which each R is the same or different and is a hydrocarbon radical selected from among alkyl, cycloalkyl, aryl, alkaryl, aralkyl, and alkenyl groups having from 1 to about 12 carbon atoms. Exemplary compounds include dimethylmagnesium, diethylmagnesium, di-nbutylmagnesium, didodecylmagnesium, di(4-t-butylphenyl)-magnesium, and diisopropenylmagnesium, and ethylbutylmagnesium, and mixtures thereof.

The halogenated, tetravalent titanium compound can be represented by $TiX_n(OR')_{4-n}$ in which X is bromine, chlorine, or iodine, R' is a hydrocarbon radical containing from 1 to about 12 carbon atoms selected from among alkyl, cycloalkyl, aryl, alkaryl, and aralkyl, and n is an integer of 3 or 4. Exemplary compounds include titanium tetrachloride, titanium tetrabromide, titanium tetraiodide, titanium bromotrichloride, titanium dichlorodiodide, titanium bromotriodide, titanium tribromo-n-butoxide, titanium trichloroethoxide, and the like, and mixtures thereof. A particularly preferred compound is titanium tetrachloride because of its availability and efficacy.

The cocatalyst component (B) can be an organoaluminum compound which can be expressed as $R''_nAlX_{3-n}$ in which R'' is a hydrocarbon radical having from 1 to about 20 carbon atoms, X is a monovalent radical selected from among the halogens and hydrogen, and n is an integer of 0 to 3. Examples of specific compounds include trimethylaluminum,, triisobutylaluminum, tridodecylaluminum, tricyclohexyaluminum, triphenylaluminum, tribenzylaluminum, diethylaluminum chloride, ethylaluminum dichloride, isopropylaluminum dibromide, diisobutylaluminum hydride, and the like, and mixtures thereof.

The mole ratio of silica to tetravalent titanium compound can range from about 1:1 to about 1000:1, preferably from about 10:1 to about 300:1.

The mole ratio of tetravalent titanium compound to dihydrocarbylmagnesium compound can range from about 0.1:1 to about 20:1, preferably from about 0.2:1 to about 10:1.

The amount of cocatalyst component (B) employed with the catalyst component (A) during polymerization can vary rather widely from about 0.005 mmole to about 10 mmole per liter of reactor contents. However, particularly good results are obtained at a more preferred range from about 0.01 mmole to about 2.5 mmole per liter of reactor contents.

The milling employed preparing catalyst component (A) is to be distinguished from ordinary admixing, shaking or tumbling, or the like. The milling refers to the strong and thorough mixing of the solid ingredients together, milling under milling conditions in such a manner as to afford significant reduction in the particle size. Milling can be by means of a ballmill, vibrating ballmilling, tower mill, or the like. A typical specific mill employable is a vibatory mill, such as a Vibratom manufactured by Siebtechnik G.M.B.H.

Milling can employ ambient, vacuum or other subatmospheric or superatmospheric pressure in an inert dry atmosphere such as nitrogen, argon or the like. Milling can result in heat being produced and, where needed, cooling means can be employed to avoid excessive temperatures which would adversely affect catalyst performance. Milling times can range widely, such as from about 1 minute to about 5 hours, and presently preferred from about 2 minutes to about 3 hours because the catalysts are sufficiently activated after such milling times. No advantage in activity is gained by exceeding the specified times. Vibratory milling typically takes a shorter time than rotary ballmilling.

Catalyst component (A) is prepared by mixing at least two different silicas in finally divided solid form with the dihydrocarbylmagnesium compound and a tetravalent titanium compound under conditions which will form a magnesium- and titanium-containing solid product. This can be accomplished in several ways. In one manner, at least two different finally divided silicas having different physical properties as set forth herein are admixed and subjected to intensive milling to form an intimate mixture of the silicas followed by contacting the milled blend with dihydrocarbylmagnesium and tetravalent titanium compounds. In another manner of preparation, each of the different silicas to be used as part of the silica support is individually contacted with dihydrocarbylmagnesium and tetravalent titanium compounds and the resulting product from each is blended and subjected to intensive milling to form an intimate mixture of the different catalyst composites.

In still another manner of preparation, at least one of the silicas is contacted with dihydrocarbylmagnesium and tetravalent titanium compounds and the resulting product is mixed with at least one different silica-containing material, which has not been contacted with magnesium and/or titanium compounds. The mixture thus formed is subjected to intensive milling and, if desired, the milled composite can be contacted with additional magnesium and/or titanium compounds.

In carrying out the various steps of the instant process, a suitable inert diluent can be used, such as aliphatic or cycloaliphatic hydrocarbon, such as butane, pentane, hexane, heptane, cyclohexane, methylcyclohexane as well as aromatic hydrocarbons including benzene and toluene. Generally, any well-known inert hydrocarbon diluent can be used.

The contacting, mixing and reacting steps of combining the silica support with magnesium and titanium compounds can be carried out generally at temperatures in the range of about −50° C. to about 200° C. with the decomposition temperatures of tetravalent titanium compounds and other organometallic compounds determining the limits. The mixing and contacting temperatures generally employed often range from about 20° C. to about 150° C.

The length of the contacting periods can vary greatly with the time period generally ranging from about one-fourth to about ten hours.

The polymerization process can be effected in a batchwise or in a continuous fashion by employing any conventional mode of contact between the catalyst system and the monomer or monomers. Thus, the monomer can be polymerized by contact with the catalyst system in solution, in suspensin, or in gaseous phase at temperatures ranging from about 20°–200° C. and pressures ranging from about atmospheric to about 1,000 psia (6.9 MPa). The polymerization process can be conducted batchwise such as in a stirred reactor or continuously such as in a loop reactor under turbulent flow conditions sufficient to maintain the catalyst in suspension.

The ethylene polymers produced are normally solid ethylene homopolymers or polymers prepared by copolymerizing ethylene with at least one aliphatic 1-olefin containing from 3 to about 10 carbon atoms or a conjugated acyclic diolefin containing 4 to 5 carbon atoms. In such polymers, the ethylene content can range from about 80 to 100 mole percent. The polymers can be converted into various useful items including films, fibers, pipe, containers, and the like by employing conventional plastics fabrication equipment.

It is especially convenient when producing ethylene polymers to conduct the polymerization in the presence of a dry hydrocarbon diluent inert in the process such as isobutane, n-heptane, methylcyclohexane, benzene, and the like at a reactor temperature ranging from about 60° C. to about 110° C. and a reactor pressure ranging from about 250 to about 600 psia (1.7–4.1 MPa). In such a process, particle form polymerization, the polymer is produced as discrete solid particles suspended in the reaction medium. The polymer can be recovered, can be treated to deactivate and/or remove catalyst residues, can be stabilized with an antioxidant system, and can he dried, all as known in the art to obtain the final product. Also, molecular weight controllers such as hydrogen can be employed in the reactor as is known in the art to adjust the molecular weight of the product, if desired.

A further understanding of the present invention and its advantages will be provided by the following examples.

EXAMPLE I

In this example the preparation of various surface-modified silica polymerization catalysts is described.

Catalyst A:

3.8 grams of Davison Type 952 silica calcined at 700° C. for about 3 hours (pore volume PV determined by alcohol absorption: 1.6–1.7 cc/g; surface area SA determined by BET/$N_2$: 280 $m^2g$; average pore diameter calculated from 4PV/SA:220 A) were slurried with a yellow mixture of 1.0 gram diphenyl silanediol, $Ph_2Si(OH)_2$, dissolved in 20 ml toluene, and 0.5 ml $TiCl_4$. The solvent was evaporated; and the solid residue was slurried in n-heptane. This solvent was also evaporated, and the residue was reslurried in n-heptane. To this slurry was added dropwise 6.5 ml of "Magala" (a mixture of 6 parts by weight of dibutylmagnesium and part by weight of tributyl-aluminum, said mixture containing about 0.5 weight-% Mg). After evaporation of the solvent, 1.0 ml of $TiCl_4$ dissolved in 9.0 ml n-heptane was added to the solid. The entire slurry system was heated to boiling for about 10 minutes. The excess $TiCl_4$ was removed by decantation. Solvents were removed by evaporation and the solid catalyst, labeled Catalyst A, was stored in a nitrogen-filled bottle.

Catalyst B:

5.3 grams of Davison Type 952 silica calcined in air at about 280° C. for 3.75 hours were slurried in about 20 ml n-heptane to which 1.0 ml dichloroacetyl chloride was added. The slurry was heated under reflux conditions for about ½ hour. After decantation of the supernatant liquid the solids were washed twice with n-heptane, with subsequent decantation of the wash solution. The solvent was evaporated, the solid was reslurried in n-heptane and heated with 3.1 mL of "Magala". After evaporation of the solvent, the impregnated silica was heated to boiling with a mixture of 1.0 ml $TiCl_4$ and 9.0 ml n-heptane for about 10 minutes. Excess $TiCl_4$ was removed by washing with n-heptane and subsequent evaporation. The dried Catalyst B was stored in a bottle filled with $N_2$.

Catalyst C:

3.5 grams of Catalyst A and 4.8 grams of Catalyst B were ball milled for about 21 hours under dry nitrogen.

EXAMPLE II

In this example the polymerization of ethylene on Catalysts A, B and C is described. A stirred 1-gallon stainless steel autoclave (Autoclave Engineering, Inc., Erie, Pa.) was charged with about 0.6 grams of Catalyst, 1.0 ml of a 15 weight-% solution of triisobutylaluminum cocatalyst in n-heptane, 100 psig ethylene and 100 psig hydrogen, and the reactor content was heated at about 80° C. for about 60 minutes. Results are summaried in Table I.

TABLE I

| Run | Catalyst Type | Catalyst Grams | PE Yield (grams) | Productivity[1] (g/g/hr) | PE Melt Index MI[2] | PE Melt Index HLMI[3] | HLMI[4]/MI |
|---|---|---|---|---|---|---|---|
| 1 | A | 0.6538 | 697.8 | 1067 | 5.2 | 204 | 39 |
| 2 | B | 0.6214 | 116.4 | 187 | 0 | 3.3 | — |
| 3 | C | 0.5979 | 49.5 | 83 | 0.19 | 13.3 | 79 |

[1]grams PE/grams catalyst/time (hours)
[2]determined according to ASTM D1238-65T, Condition E
[3]determined according to ASTM D1238-65T, Condition E
[4]a measure of molecular weight distribution, the higher HLMI/MI the broader the MW distribution Data in Table I show that the inventive mixed catalyst C produced a polymer having a much broader molecular weight distribution than PE prepared on Catalyst A. Also the HLMI of the polymer produced in run 3 was surprisingly much lower than the expected value of about 88 (calculated from HLMI's of PE produced by Catalysts A and B and the weight percentages of A and B in C). Thus the HLMI of the Run 3 PE is only about 15% of the expected value.

A size exclusion (gel permeation) chromatogram (determined in accordance with G. Kraus et al., J. Poly. Sci A-Z, 657 (1972) and J. Poly. Sci. Sumpos. No. 43, 329 (1973) of the run 3 polymer clearly showed two peaks and thus indicates the formation of a "biomodal" polymer, i.e., a mixture of two types of PE having significantly different molecular weights.

That which is claimed is:

1. A process for the production of ethylene polymers having broad molecular weight distribution, which comprises contacting ethylene and mixtures of ethylene with minor amounts of at least one higher mono-1-olefin under polymerization conditions with a catalyst composition comprising:
   (a) a magnesium/titanium-containing catalyst component (A)
   supported on a milled blend of at least two different silica-containing materials which have different MI (polymer melt index) potentials in which at least two of the silica-containing materials have been chemically treated with different chemical agents with the further proviso that one of the silicas is reacted with a silating compound selected from the group consisting of (1) chlorosilanes having the formula $R_c{}^2SiCl_{4-c}$ in which $R^2$ is phenyl or alkyl group of 1 to about 6 carbon atoms, and c is an integer of 1,2 or 3 and (b 2) diphenyl silanediol and at least one other of the silicas is reacted with a carboxylic acid chloride of the formula

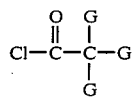

in which each G is selected from the group consisting of chlorine, alkyl of 1 to about 3 carbon atoms, hydrogen, and phenyl, with at least one G being chlorine, and
   (b) an organolauminum cocatalyst component (B)

$R''_nAlX_{n-3}$, wherein R'' is a hydrocarbon radical having from 1 to about 20 carbon atoms, n is an integer of 0 to 3, and X is halogen or hydrogen.

2. A process according to claim 1 wherein each silica is contacted with dihydrocarbylmagnesium compound and titanium compound before blending with another silica similarly treated with dihydrocarbylmagnesium and titanium compounds and then the mixture of different silicas is subjected to intensive milling to form an intimate blend of the silica, magnesium and titanium compounds.

3. A process according to claim 1 wherein said silicas are blended and intensively milled to produce an intimate milled mixture of silicas prior to contacting with said magnesium and titanium compounds.

4. A process according to claim 1 wherein said magnesium compound is dibutylmagnesium, said titanium compound is titanium tetrachloride, and said organoaluminum compound is triisobutylaluminum.

5. A process according to claim 4 wherein one silica has been treated with diphenyl silanediol and a second silica has been treated with dichloroacetyl chloride.

6. A process according to claim 5 wherein said monomer comprises ethylene.

7. A process according to claim 2 wherein said magnesium compound is dibutylmagnesium, said titanium compound is titanium tetrachloride, and said organoaluminum compound is triisobutylaluminum.

8. A solid polymerization magnesium/titanium-containing catalyst component prepared by mixing
   (a) a silica support comprising a blend of at least two silica-containing components having different MI (polymer melt index) potentials in which at least two of the silicas have been chemically treated with different agents which react with part or substantially all of the OH groups on the surface of the silica with the further proviso that one of the silicas is reacted with a silating compound slected from the group consisting of (1) chlorosilanes having the formula $R_c{}^2SiCl_{4-c}$ in which $R^2$ is phenyl or alkyl group of 1 to about 6 carbon atoms, and c is an integer of 1,2 or 3 and (2) diphenyl silanediol and at least one other of the silicas is reacted with a carboxylic acid chloride of the formula

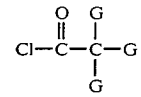

in which each G is selected from the group consisting of chlorine, alkyl of 1 to about 3 carbon atoms, hydrogen, and phenyl, with at least one G being chlorine,
   (b) a dihydrocarbylmagnesium compound,
   (c) a halogenated tetravalent titanium compound, and
   (d) a cocatalyst component (B) comprising an organoaluminum compound.

9. A composition according to claim 8 wherein said titanium compound is a titanium tetrahalide.

10. A composition according to claim 8 wherein said magnesium compound is dibutylmagnesium and said titanium compound is titanium tetrachloride.

11. A composition according to claim 10 which additionally contains a cocatalyst component (B) comprising triisobutylaluminum.

12. A composition according to claim 11 wherein one silica has been treated with diphenyl silanediol and a second silica has been treated with dichloroacetyl chloride.

13. A process of producing a polymerization catalyst which comprises a milled catalyst component (A) formed from
   (1) a blend of at least two different silica-containing having differnt MI (polymer melt index) potentials in which at least two of the silicas have been chemically treated with different agents which react with part or substantially all of the OH groups on the surface of the silica with the further proviso that one of the silicas is reacted with a silating compound selected from the group consisting of (1) chlorosilanes having the formula $R_c{}^2SiCl_{4-c}$ in which $R^2$ is phenyl or alkyl group of 1 to about 6 carbon atoms, and c is an integer of 1,2 or 3 and (2) diphenyl silanediol and at least one other of the silicas is reacted with a carboxylic acid chloride of the formula

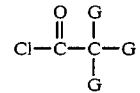

in which each G is selected from the group consisting of chlorine, alkyl of 1 to about 3 carbon atoms, hydrogen, and phenyl, with at least one G being chlorine, and
   (2) dihydrocarbylmagnesium compound, and
   (3) a halogenated tetravalent titanium compound, isolating and purifying the product forming component (A), and
   (4) combining purified component (A) with an organoaluminum cocatalyst component (B).

14. A process according to claim 13 wheein said silicas are admixed and subjected to intensive milling to form an intimate mixture thereof prior to contacting with said magnesium and said titanium compounds.

15. A process according to claim 13 wherein each of said silicas forming catalyst component (A) is first treated with said magnesium and said titanium compounds prior to admixing with another silica which has been similarly treated, and combining the resulting treated silicas and subjecting same to intensive milling to form an intimate mixture thereof.

* * * * *